June 4, 1940.  G. BORNEMAN  2,203,252
FISHING FLOAT
Filed Aug. 6, 1938
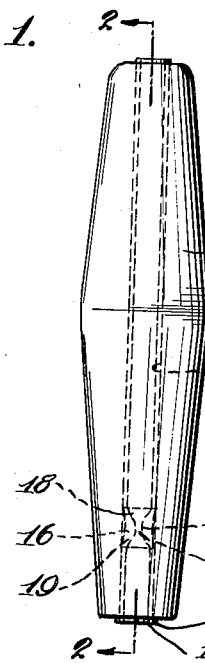
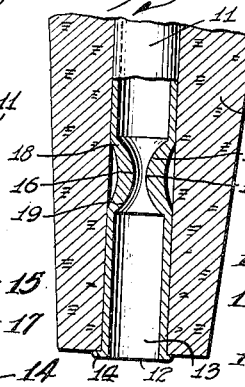
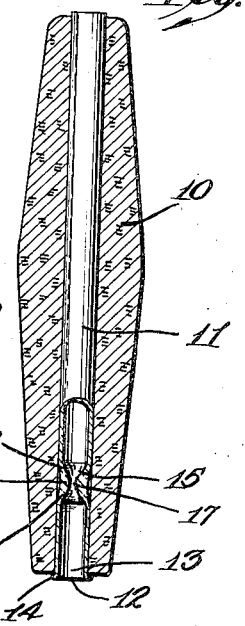
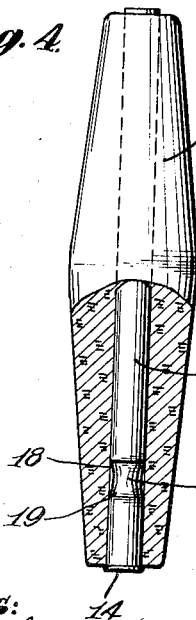
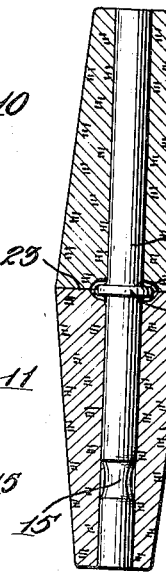
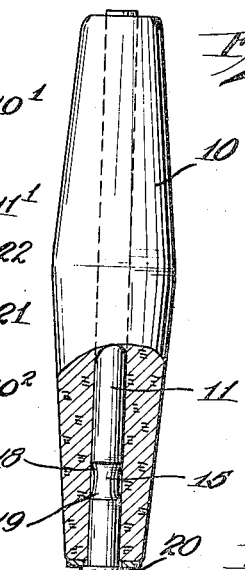
Inventor
George Borneman Patented June 4, 1940

2,203,252

UNITED STATES PATENT OFFICE 2,203,252

FISHING FLOAT

George Borneman, Millville, N. J.

Application August 6, 1938, Serial No. 223,416

3 Claims. (Cl. 43—49)

My invention relates to fishing floats such as are used for the support of a hook in hook-and-line fishing.

One of the purposes of my invention is to provide continued freedom of passage of a line through the float between limits set by stops on the line.

A further purpose is to protect the line-passage through a float from contamination due to continued use or to neglect.

A further purpose is to place a lining of glass within a float passage for a fish line and to load the float by integrally loading the glass in the lower part of the passage.

A further purpose is to insert a glass tube within a fishing float so as to give free movement of the fishing line through the glass and then, in the lower part of the passage, to constrict the glass tube for the purpose of reliably forming a minimal size of opening and permitting the stoppage of movement of the fishing line in the lower end of the float. The loading of the weight of the float by the constriction provides a double function for this constriction.

Further purposes will appear in the specification and in the claims.

I have preferred to illustrate the invention by one form only with minor modifications, selecting a form which is practical, efficient and very inexpensive and which at the same time well illustrates the principles of the invention.

Figure 1 is a side elevation of one type of float in which my invention is embodied.

Figure 2 is a section of Figure 1 taken upon line 2—2.

Figure 2a is a partial section corresponding generally to Figure 2 but showing an alternative form.

Figure 2b is a fragmentary enlarged section of a portion of Figure 2.

Figure 3 is a top plan view of the float of Figures 1, 2 and 2a.

Figure 4 is a side elevation partly broken away showing the tube used in Figures 1, 2, 2a and 3.

Figure 5 is a longitudinal section, similar to Figure 2, but showing a further alternative form.

Similar numerals indicate like parts in all figures.

It is quite desirable to have a fishing line pass vertically through the middle of its float, both because the strain of the line is uniformly distributed with respect to the float and because it permits the line to pass freely through the float between the limits set by knots, sinkers or other projections in the line.

When the line is central, the line, hook, sinker, and float, all rather close together, may be cast to any desired position and the sinker will then carry the hook down, pulling the line through the float until a stop on the line engages a constriction in the passage through the float to determine the depth below the float at which the hook will be suspended. This form of determining the fishing depth is very old, but in some types of fishing is quite desirable. It not only permits concentration of the weight during casting, as indicated, but it also allows the line to be reeled in almost to the sinker or hook after the fish has been caught.

When fishing with a float, it is good practice to adjust the distance between the float and the hook so that this distance will be no greater than the length of the rod or fishing pole, thus facilitating landing a fish. With the sliding device of the present invention all difficulty is overcome and the fisherman may fish at any depth desired without experiencing any difficulty in landing a fish since the float is capable of sliding with respect to the line.

Metal tubes have been used as linings for float passages but have the serious objection that the line unduly sticks to their inner surfaces even when they are new and clean and that this is greatly increased when the inner surfaces of the metal tubes have become corroded. Unlined floats have also been used which have the objection that they swell, that they do not dry out quickly and that the fishing line clings unduly to their surfaces also.

A glass tube forms a much better inner surface for contact by the line than any of these prior surfaces and provides other desirable features for the float not available in any of the previous proposals known to me.

The shape of the float 10 is intended to be conventional inasmuch as the tube is suited to be used as lining for any of the types of float normally used, but is selected for illustration because of its very desirable float shape. It is long enough to have a very considerable exposed top and when made of cork, as preferred, is light enough to offer but slight weight on the fishing line. It is readily weighted by the present invention so to stand almost perpendicularly in the water.

In the preferred forms of Figures 1, 2, 3 and 4, tube 11 may be inserted from either end and requires no special provision to hold in its place, as frictional engagement with the inner wall of the float will hold it there. At one end it may be flared at 12 to provide a line guiding surface 13 on the inside. This also provides a flange 14 on the outside which limits the extent of introduction into the float.

The tube throughout nearly all of its length is of much larger internal diameter than the diameter of the fishing line and allows very free passage of the fishing line, as also passage of knots which may be located in the line ultimately to limit its movement. At the point 15 in the tube its internal diameter is diminished in order to limit the opening for stop purposes. The diameter of this diminished opening or narrow passageway is made enough greater than the diameter of the line to permit free run of the line and yet to stop a knot or other projection or enlargement. The diminished opening is preferably secured by thickening the glass rather than by collapsing the outside walls. The glass is softened and is then pushed longitudinally while maintaining nearly the outside diameter of the glass. The compression which takes place is therefore inward.

The inward thickening forms a wall 16 within which an opening of general hour-glass shape is provided, the neck 17 of the hour-glass being approximately at the middle of the thickening and the inner walls flaring outwardly away from this neck at 18 and 19 to merge with the normal inner walls of the tube.

It will be noted that the hour-glass taperings produced, form very excellent guiding surfaces to the narrow cross-section at the neck, facilitating feeding the fishing line through this contracted portion of the tube and reducing friction at this point.

At the same time, the thickened wall forms a desirable stop to limit passage of the fishing line through the float, and the additional weight provided is quite desirable in the lower part of the float. In Figure 2a provision is made for additional weighting of the bottom of the float if this be desired by a metal washer 20 which may be held in place by the flange 14 upon the glass tube.

The tube adds little to the weight of the float, except for the thickening deliberately for that purpose. This is true particularly because the glass wall is supported by the grip of the surrounding float largely removing from consideration the usual requirements as to strength of the tube.

In the forms of Figures 1, 2, 3 and 4 and 2a, the float 10 is preferably made of a rigid piece of cork. In the form of Figure 5, two float portions 10′ and 10², suitably of cork, are applied from opposite ends of a glass tube 11′ having a central enlargement 21 which engages the ends of the float portions which are suitably cut out as at 22 to allow for it. The float portions join at 23 opposite the enlargement and are suitably secured together and to the tube, as by adhesive. The thickened wall and narrowed passageway at 15 functions the same as in the other forms, weighting the bottom of the float to maintain it vertical, and engaging knots or other projections on the fishing line to limit float motion, while leaving the line free to slide without likelihood of jamming the knots in the tube.

In view of my invention and disclosure, variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:

1. A fishing float having a passageway, and a glass tube forming a lining for substantially the full length of the passageway, a portion of the tube between its ends having a greater mass per unit length than the rest of the tube, thereby providing a restricted opening spaced from the bottom of the tube.

2. A fishing float having a tubular passageway throughout its length and a glass tubular member within the passageway, the tubular member having a contraction near but above the bottom of the float which for the length thereof has a wall thickness of greater dimension than the wall thickness of the remainder of the tube, thereby providing a tapered restriction of the passageway and an additional weight at the point of restriction.

3. A fishing float having two portions, each portion being enlarged at one end, the portions being joined together at their enlarged ends and a glass tube passing through the float, secured to the portions and holding the two portions together, said glass tube having an enlargement aiding to prevent longitudinal movement of the tube within the portions, and a flared constricted portion adjacent the lower end thereof.

GEORGE BORNEMAN.